United States Patent
Sonoda et al.

(10) Patent No.: US 7,942,772 B2
(45) Date of Patent: May 17, 2011

(54) SILENT CHAIN

(75) Inventors: Masatoshi Sonoda, Osaka (JP);
Takayuki Morimoto, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 385 days.

(21) Appl. No.: 12/266,687

(22) Filed: Nov. 7, 2008

(65) Prior Publication Data

US 2009/0149288 A1    Jun. 11, 2009

(30) Foreign Application Priority Data

Dec. 11, 2007   (JP) .................. 2007-319611

(51) Int. Cl.
*F16G 13/04*   (2006.01)
*F16H 7/06*    (2006.01)

(52) U.S. Cl. ......... 474/212; 474/206; 474/215; 474/217

(58) Field of Classification Search .............. 474/202, 474/206, 212, 213, 214, 215, 216, 217
See application file for complete search history.

(56) References Cited

U.S. PATENT DOCUMENTS

| | | | | |
|---|---|---|---|---|
| 5,263,903 | A | * | 11/1993 | Mott ........................ 474/213 |
| 6,325,735 | B1 | | 12/2001 | Kanehira et al. |
| 7,568,334 | B2 | * | 8/2009 | Fujiwara et al. ............ 59/5 |
| 2002/0128102 | A1 | * | 9/2002 | Bubel et al. .............. 474/212 |
| 2003/0236145 | A1 | * | 12/2003 | Ledvina et al. ........... 474/215 |
| 2008/0015071 | A1 | * | 1/2008 | Fujiwara et al. .......... 474/206 |

FOREIGN PATENT DOCUMENTS

JP   2000-346142   12/2000

* cited by examiner

*Primary Examiner* — Emmanuel M Marcelo
(74) *Attorney, Agent, or Firm* — Howson & Howson LLP

(57) ABSTRACT

In a silent chain having interleaved guide rows and joint rows, guide plates at the outer sides of the guide rows are connected by engagement pins which extend through overlapping recesses formed on the outer flanks of the guide row plates, and on the inner flanks of the joint row plates. The engagement pins contact sprocket teeth before the outer flanks of the guide row plates contact the sprocket teeth. Cutouts formed in the guide plates adjacent the engagement pins allow the guide plates to deform and thereby absorb the impact imparted to the engagement pins by the sprocket teeth.

8 Claims, 7 Drawing Sheets

SILENT CHAIN

CROSS-REFERENCE TO RELATED APPLICATION

This application claims priority on the basis of Japanese patent application 2007-319611, filed Dec. 11, 2007. The disclosure of Japanese application 2007-319611 is hereby incorporated by reference.

FIELD OF THE INVENTION

The invention relates silent chains for use in power transmission mechanisms, transfer mechanisms, and the like. Such chains have applications in machinery, including industrial machinery, as well as automotive applications. Although the invention is not limited to automotive applications, it has particular advantages when used as a timing chain for transmission of power from a crankshaft to one or more camshafts in an automobile engine, because the chain according to the invention includes features which reduce engagement noise generated as the chain comes into engagement with a sprocket, and which increase the useful life of the chain.

BACKGROUND OF THE INVENTION

A typical silent chain is composed of alternating guide link rows and joint link rows. Each guide link row is composed of a pair of opposed guide plates which prevent the chain from sliding sideways off a sprocket, and a plurality of guide row plates disposed between the pair of guide plates. Each of the guide row plates has a pair of teeth having inner and outer flanks, the outer flanks having outer engagement surfaces for seating engagement with sprocket teeth. Each joint link row is composed of a plurality of joint row plates which also have a pair of teeth with inner and outer flanks. The outer flanks of the teeth of the joint link rows also have outer engagement surfaces for seating engagement with sprocket teeth. The guide link rows and joint link rows are arranged alternately along the length of the chain, and the plates of the each joint link row are interleaved with the plates of two adjacent guide link rows and extend between the guide plates of said adjacent guide link rows. Connecting pins connect the guide link rows and joint link rows in articulating relationship so that, as the chain approaches a sprocket and a row of plates becomes seated on the sprocket, the immediately following row can pivot about the trailing connecting pin of the seated row as the chain wraps around the sprocket. An example of a typical conventional silent chain is described in U.S. Pat. No. 6,325,735.

The conventional silent chain reduces sliding noises that occur as the chain comes into engagement with a sprocket. However, the conventional chain does not suppress impact noise and impact force sufficiently well to satisfy the increasing demand for noise reduction. Furthermore the conventional chain is subject to premature wear at the locations at which the impact forces are concentrated.

An object of this invention is to provide a silent chain in which impact noise and impact force are significantly reduced, and which has an increased useful life.

SUMMARY OF THE INVENTION

The silent chain of the invention is an elongated silent chain comprising guide link rows and joint link rows. Each guide link row is composed of a pair of opposed guide plates and a plurality of guide row plates disposed between the pair of guide plates. Each of the guide row plates has a pair of teeth having inner and outer flanks, the outer flanks having outer engagement surfaces for seating engagement with sprocket teeth. Each joint link row is composed of a plurality of joint row plates, each joint row plate also having inner and outer flanks The outer flanks of the teeth of the joint link rows also have outer engagement surfaces for seating engagement with sprocket teeth. The guide link rows and joint link rows are arranged alternately along the length of the chain, and the plates of the each joint link row are interleaved with the plates of two adjacent guide link rows and extend between the guide plates of said adjacent guide link rows. Connecting pins connect the guide link rows and joint link rows in articulating relationship.

A pair of engagement pins connect the opposed guide plates of each guide link row to each other. The engagement pins of each guide link row have outer surfaces which protrude beyond the outer engagement surfaces of the outer flanks of the guide row plates in the same guide link row. Because the outer surfaces of the engagement pins protrude beyond the outer engagement surfaces of the guide row plates, the engagement pins abut sprocket teeth before the sprocket teeth are engaged by the outer engagement surfaces of the guide row plates.

Each guide plate has two cutout portions, one cutout portion being located adjacent each of the engagement pins attached to the guide plate. Both of the cutout portions of each guide plate are located between the engagement pins, and enable portions of the guide plates to which the engagement pins are connected to deform and thereby absorb loads generated on abutment of the engagement pins with sprocket teeth. A recess is formed in each outer engagement surface of each guide row plate, and the engagement pins of each guide row extend through the recesses in the guide row plates thereof. These recesses partially surround the engagement pins. They only provide clearance for the engagement pins, but are sufficiently deep that they also allow abutment of the outer engagement surfaces of the teeth of the guide row plates with sprocket teeth as the guide plates deform following abutment of the engagement pins with the sprocket teeth.

A recess is also formed in each inner flank of each joint row plate. Each of these inner flank recesses partially surrounds an engagement pin of an adjacent guide row at least when the chain is stretched in a straight line. The recesses in the inner flanks of the joint row plates allow deformation of the teeth of the joint row plates on engagement of their outer flanks with sprocket teeth, thereby reducing the load on the joint row plates.

When an engagement pin abuts a sprocket tooth prior to abutment of the adjacent outer engagement surfaces of the guide row plates with the same sprocket tooth, the adjacent cutout portions of the guide plates deform, exhibiting a cushioning action which absorbs the load on the guide plates. As the cutout portion of the guide plate deforms, the engagement pin moves farther into the recesses in the outer engagement surfaces of the guide row plates, allowing the outer engagement surfaces to come into abutting relationship with the sprocket tooth. As a result of the initial engagement of the engagement pin with the sprocket tooth, and the cushioning action resulting from deformation of the cutout portions of the guide plates, impact noise and impact forces that occur at the time of engagement between the outer engagement surfaces of the guide row plates and a sprocket tooth are significantly reduced. Moreover, wear of the outer engagement surfaces of the guide row plates is suppressed, so that the useful life of the chain is extended.

Deformation of the recesses formed on the inner flanks of the joint row plates absorbs and reduces the load on the joint row plates by exhibiting a cushioning action at the time of engagement of their outer engagement surfaces with a sprocket tooth. The deformation of these recesses contributes to the reduction of impact noise and impact force which occur on engagement between the outer engagement surfaces of the joint row plates and the sprocket tooth. Deformation of these recesses also reduces wear of the outer engagement surfaces of the joint row plates and thereby contributes to the extension of the useful life of the chain.

In a preferred embodiment of the invention, the front and rear portions of each plate of the chain have symmetrical profiles. That is, the front and rear portions of each of the guide plates, the guide row plates and the joint row plates of the chain, spaced from each other along the direction of elongation of the chain, are symmetrical about a plane of symmetry located between said front and rear portions and to which the direction of elongation of the chain is perpendicular. The symmetry of the plates makes it unnecessary to take the front-to-back orientation of the plates into account, and thereby facilitates assembly of the chain.

Preferably, the recess In an outer engagement surface of each guide row plate overlaps a recess in the inner flank of an adjacent joint row plate so that the overlapping recesses both partially surround an engagement pin. This construction provides a clearance for the engagement pins, enables the recesses in the outer engagement surfaces of the guide row plates to exhibit a cushioning action as these outer engagement surfaces come into abutment with a sprocket tooth, and also enables the recesses in the inner flanks of the joint row plates to exhibit a cushioning action when the outer flanks of the joint row plates come into abutment with a sprocket tooth. Thus the load on the guide row plates and on the joint row plates is reduced.

It is also preferable that the strength of each said guide plate be smaller than the strength of each said guide row plate and each said joint row plate. When the strength of each guide plate is made smaller than that of each guide row plate and each joint row plate, the deformable cutout portions of the guide plates more easily exhibit a cushioning action reducing impact noise and impact force, and also allow the guide plates to absorb and reduce vibration noise due to characteristic frequencies of the guide row plates and the joint row plates.

DETAILED DESCRIPTION OF THE PREFERRED EMBODIMENTS

Briefly, in the silent chain of the invention, engagement pins connecting opposed guide plates have outer surfaces which protrude beyond the outer engagement surfaces of the guide row plates, and therefore abut sprocket teeth before the sprocket teeth are engaged by the guide row plates. Cutout portions of the guide plates allow the guide plates to deform and thereby absorb loads generated as the engagement pins abut the sprocket teeth. Recesses in the outer engagement surfaces of the guide row plates provide clearance for the engagement pins, and allow abutment of the outer engagement surfaces of the guide row plates with sprocket teeth. Recesses in the inner flanks of the joint row plates also provide clearance for the engagement pins, and allow deformation, reducing the load on the joint row plates. As a result, impact noise and impact forces are significantly reduced, and the useful life of the silent chain is extended.

The invention can be embodied in silent chains of various kinds. For example, the connecting pins of the chain can be round pins or rocker joint pins. The outer engagement surfaces of the guide row plates and the joint row plates can be blanked surfaces, blanked and subsequently shaved, or fine blanked. A fine blanked engagement surface is preferable, as it slides smoothly on engagement with a sprocket tooth, and exhibits superior wear resistance.

Figure 1:
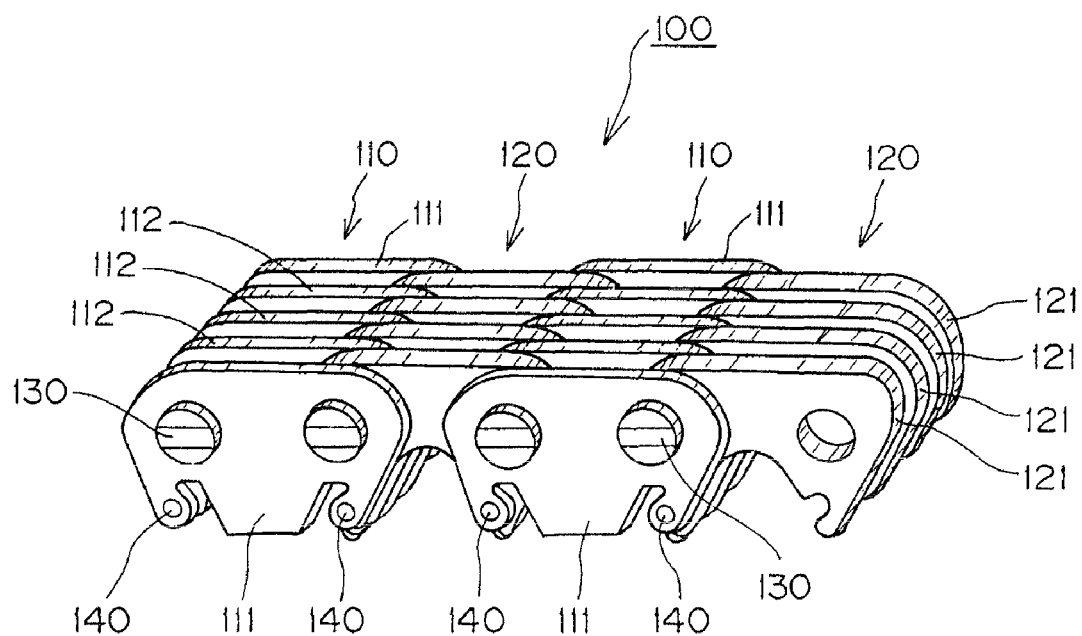
FIG. 1 is a perspective view of a portion of a silent according to the invention.

FIG. 1 shows a silent chain 100 according to the invention. This chain can be used as a timing chain for transmission of power from a crankshaft to one or more camshafts in an automobile engine. The chain is composed of alternating, interleaved, guide rows 110 and joint rows 120.

Figure 2:
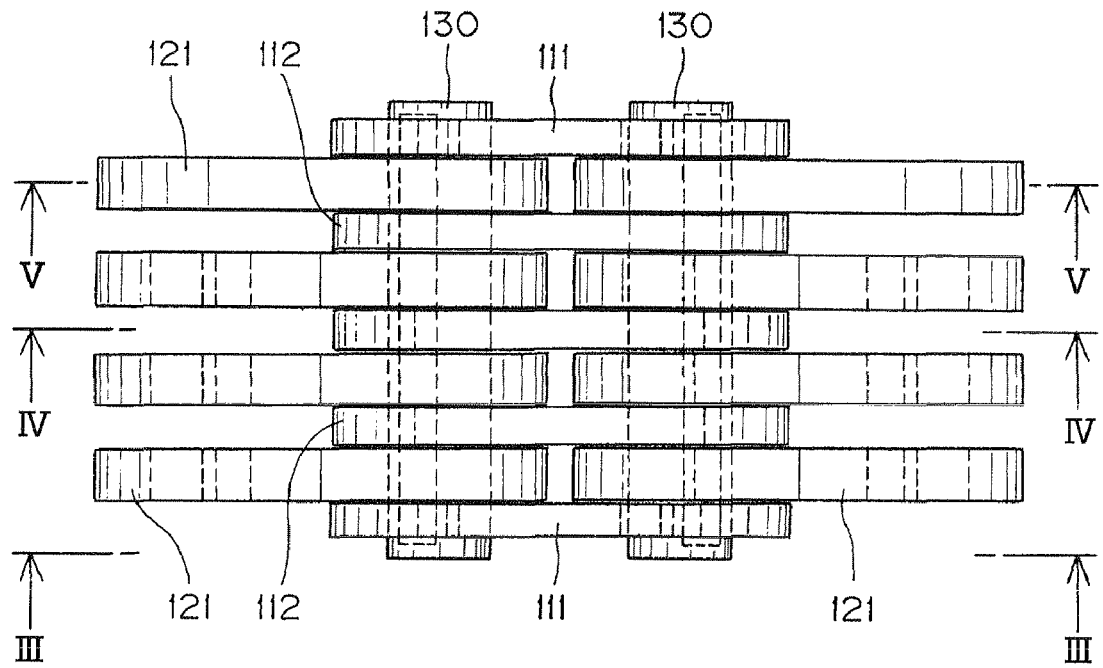
FIG. 2 is a plan view of a portion of the silent chain.
Figure 3:
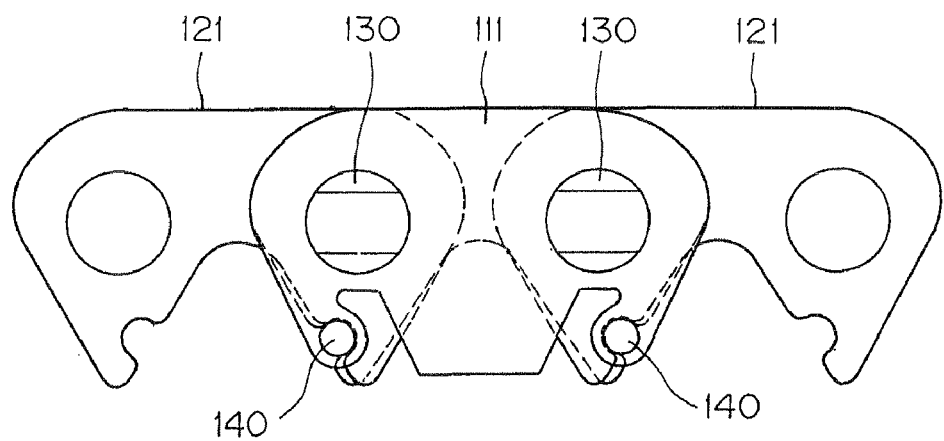
FIG. 3 is a side elevational view of the portion of the silent chain as seen through imaginary plane 3-3 in FIG. 2.
Figure 4:
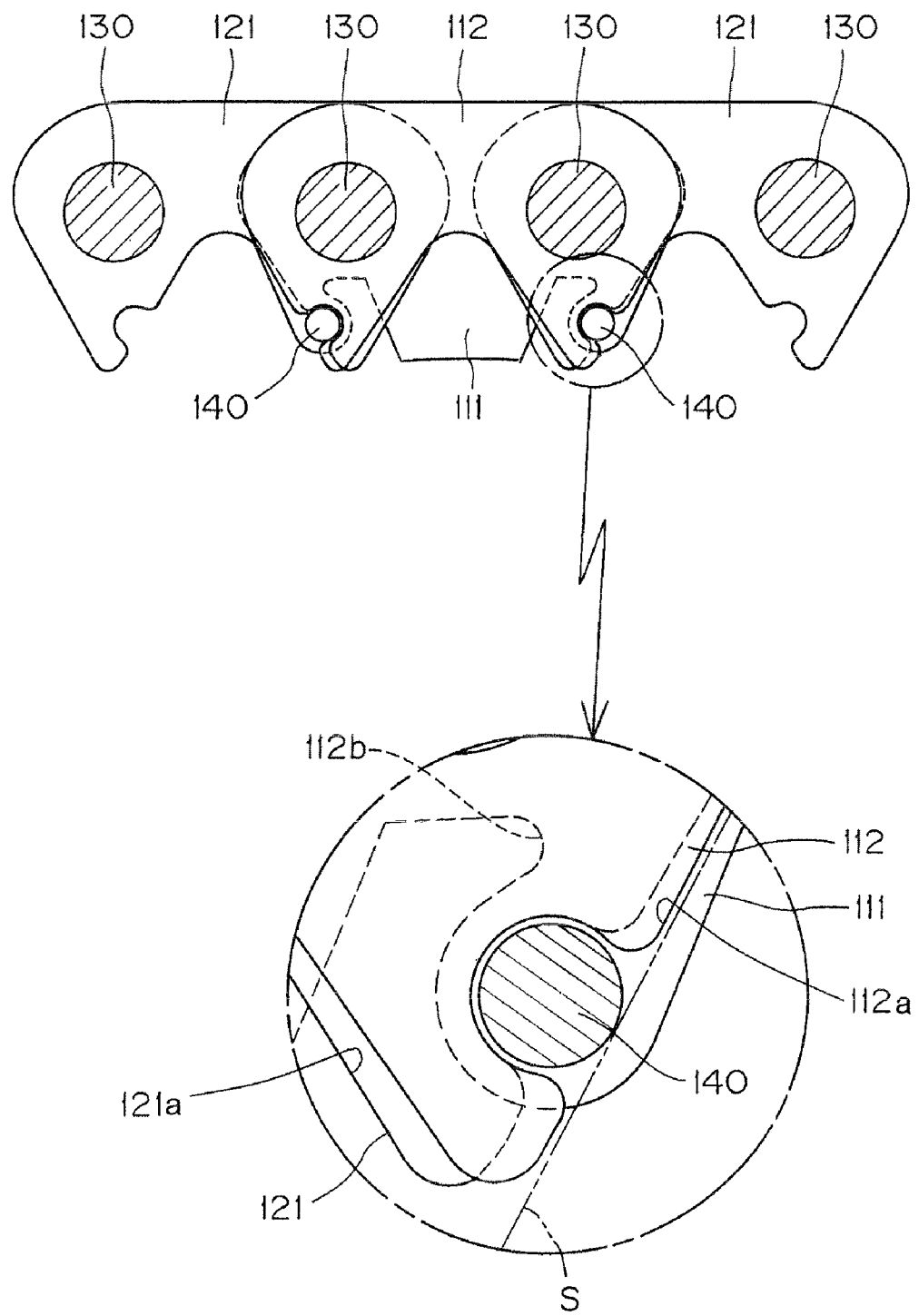
FIG. 4 is a cross-sectional view taken on section plane 4-4 in FIG. 2, including an enlarged auxiliary view.
Figure 5:
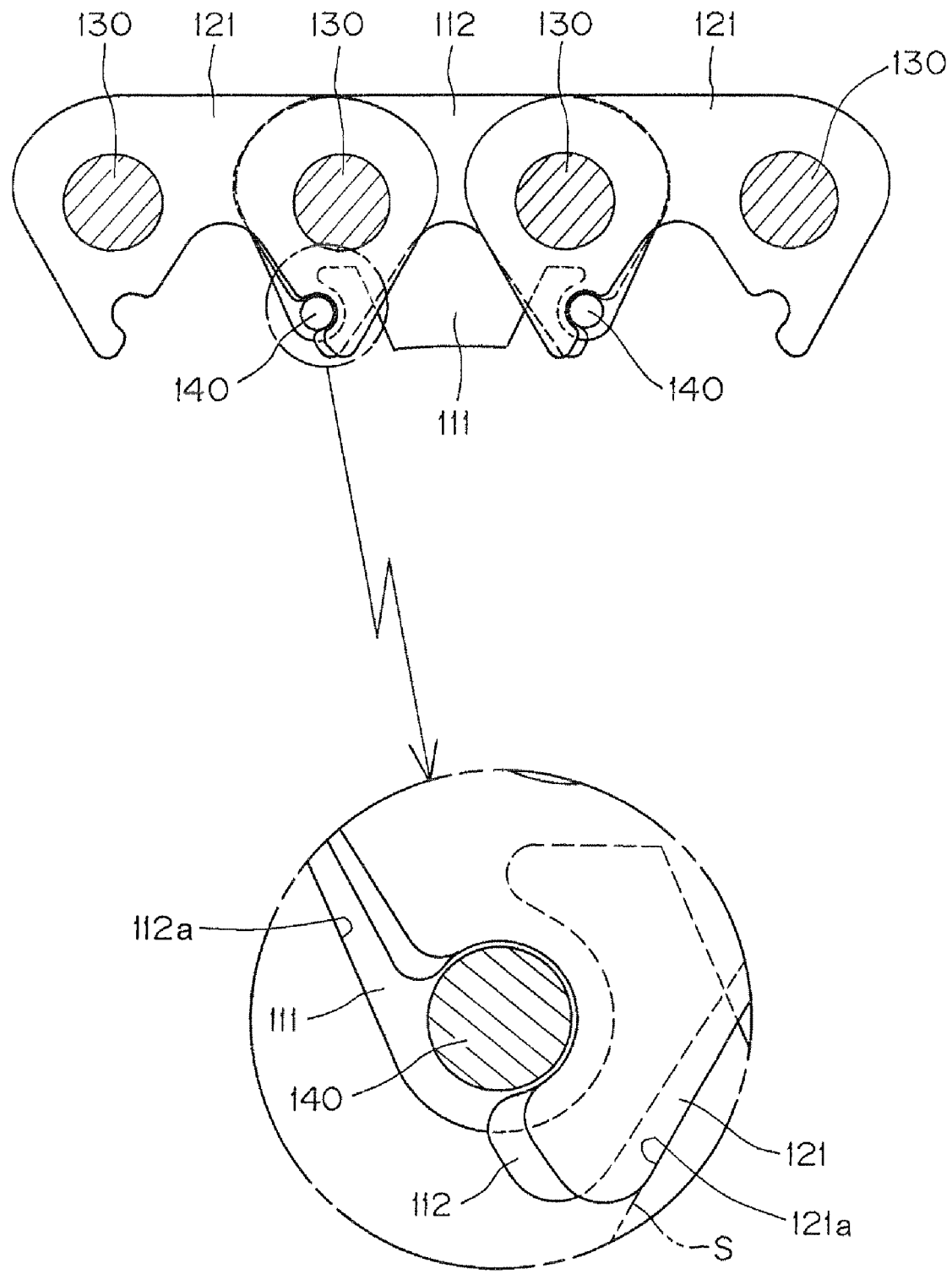
FIG. 5 is a cross-sectional view taken on section plane 5-5 in FIG. 2, including an enlarged auxiliary view.

As shown in FIGS. 1-3, guide rows 110 are each composed of a pair of guide plates 111, and three guide row plates 112 disposed between the guide plates. The joint rows 120 are each composed of four joint row plates 121. The guide rows and joint rows are flexibly connected by connecting pins 130 which extend transverse to the direction of elongation of the chain. In the embodiment shown, the connecting pins 130 are round connecting pins, which are fixed to the guide plates and extend through holes in the guide row plates 112 and the joint row plates 121. As shown in FIGS. 4 and 5, the silent chain has outer engagement surfaces 112a on the guide row plates and outer engagement surfaces 121a on the joint row plates 121. The chain is an outer flank engagement, outer flank seating type chain. That is, the outer engagement surfaces of the plates are the plate surfaces that first engage the sprocket teeth and also contact the sprocket teeth when the chain is seated on the sprocket. The engagement pins, of course, engage the sprocket teeth before the adjacent outer engagement surfaces of the guide row plates.

As shown in FIGS. 1, 3 and 4, two engagement pins 140 connect the opposed guide plates 111 in each guide row. These engagement pins preferably have cylindrical sprocket tooth-engaging surfaces. As the chain approaches a sprocket, the leading engagement pin 140 of each guide row abuts a sprocket tooth prior to engagement the sprocket tooth by an outer engagement surface 112a of a guide row plate 112.

Figure 6:
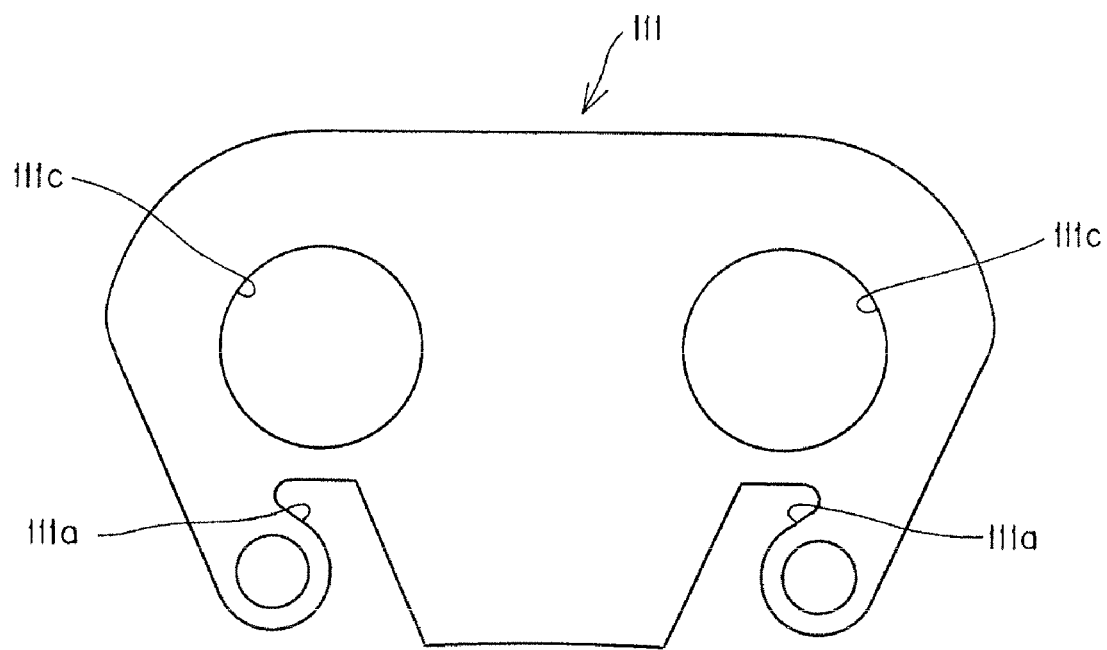
FIG. 6 is an enlarged side elevational view of a guide plate.

As shown in FIG. 6, two cutouts 111a are formed in each guide plate 111 adjacent the portions of the guide plates to which the engagement pins are connected. Both cutouts are located between the engagement pins in the longitudinal direction of the chain, so that they are located on the sides of the pins opposite from the sides of the pins that come into abutting engagement with sprocket teeth. The cutouts are preferably shaped so that they partially surround the engagement pins. The cutouts allow deformation of the portions of the guide plates to which the engagement pins are connected, so that the guide plates can absorb the load imparted to the engagement pins as the pins come into abutment with sprocket teeth.

Figure 7:
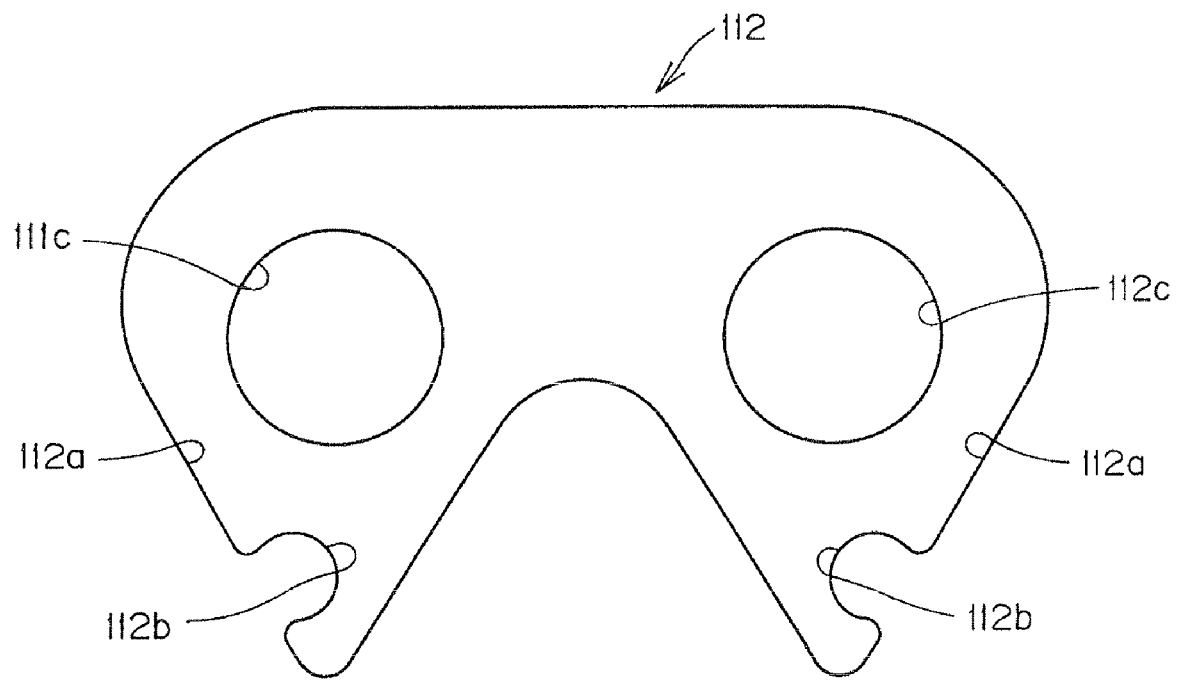
FIG. 7 is an enlarged side elevational view of a guide row plate.

As shown in FIG. 7, curved, engagement pin-receiving, recesses 112b, are formed in the outer engagement surfaces 112a of each guide row plate 112. As shown in FIG. 4, when an engagement pin 140 abuts a sprocket tooth surface S before the adjacent outer engagement surface 112a contacts the sprocket tooth, cutouts 111a of the guide plates 111 allow the guide plates to deform, thereby exhibiting a cushioning action, absorbing and reducing the load on the guide plates. As the cutout portions 111a of the guide plate 111 deform, the engagement pin 140 moves farther into the recesses 112b, allowing the engagement surface 112a to come into abutment with the sprocket tooth.

Figure 8:
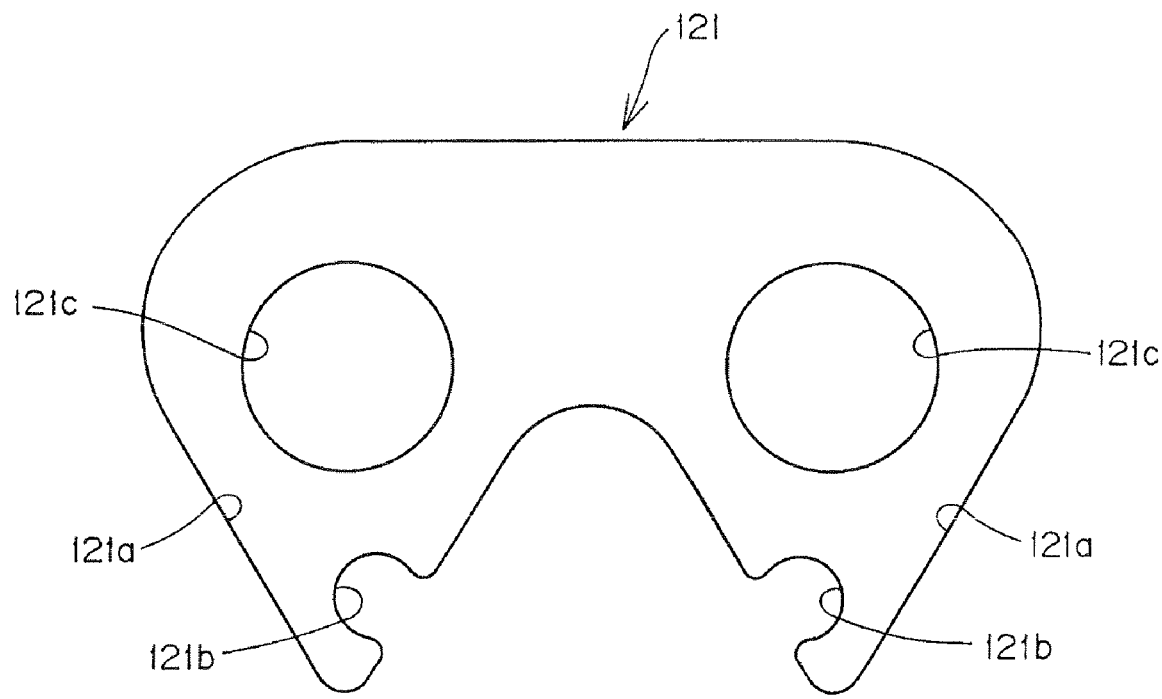
FIG. 8 is an enlarged side elevational view of a joint row plate.

As shown in FIG. 8, curved recesses 121a are formed on the inner flanks of each joint row plate 121. These recesses partially surround, and provide clearance for, the engagement pins 140, and allow deformation of the teeth of the joint row plates so that they can exhibit a cushioning action, absorbing and reducing the load imparted to the joint row plates as their outer engagement surfaces 121a come into abutment with a sprocket tooth S as shown in FIG. 5.

As shown in FIGS. 6-8, pin holes 111c, 112c and 121c are provided in the guide plate 111, the guide row plate 112 and the joint row plate 121, respectively. The profiles of the guide plates 111, the guide row plate 112 and the joint row plates 121 are preferably symmetrical. More particularly, each plate has front and rear portions spaced from each other along the direction of elongation of the chain, and the front and rear portion of each plate are symmetrical about a plane of symmetry located between said front and rear portions and to which the direction of elongation of the chain is perpendicular. Thus, in the process of assembly of the chain, it is not necessary to take the front to back orientations of the plates into account, and the assembly of the chain is significantly simplified.

As shown in FIGS. 3 to 5, the recess 112b of the guide row plate 112 and the recess 121b of the joint row plate 121 overlap and both partially surround an engagement pin 140.

When an outer engagement surface 112a of the guide row plate 112 or an outer engagement surface 121a of the joint row plate 121 engages a sprocket tooth, the recess 112b of the guide row plate 112 or the recess 121b of the joint row plate 121 exhibit a cushioning effect, allowing the plates to absorb and reduce the loads imparted to the plates by sprocket teeth.

The guide plate 111 is preferably made thinner than the guide row plate 112 and the joint row plate 121. Thus, the total of the plate thicknesses in a guide row 110, composed of a pair of guide plates 111 and three guide row plates 112, can be balanced, or at least more nearly balanced, with the total of the plate thicknesses in a joint link row 120 composed of four joint row plates 121. In addition, because the guide plate is thinner, its strength is less than that of the guide row plate and the joint row plate. Consequently, when the engagement pin 140 abuts a sprocket tooth prior the cutout 111a in the guide plate 111 allow the guide plate to deform more easily so that it exhibits a cushioning effect, reducing impact noises and impact force, and absorbing and reducing vibration noise due to characteristic frequencies of the guide row plates and the joint row plates.

In the silent chain according to the invention, the guide row plates and joint row plates are of the outer flank engagement/outer flank seating type. The engagement pins 140 abut the sprocket teeth prior to abutment of the outer engagement surfaces 112a of the guide row plates 112. The cutouts 111a of the guide plates 111 on the non-abutting sides of the engagement pins 140 allow the guide plates to deform, absorbing and reducing the load exerted on the engagement pins. As the opposed guide plates on opposite ends of a guide row deform while their cutouts 111a are bent, the outer engagement surfaces 112a of the guide row plates 112 abut the sprocket tooth, and, at the same time, the engagement pin moves farther into recesses 112b. Impact noise and impact forces, which would otherwise occur as the outer engagement surfaces 112a of the guide row plates 112 begin to engage a sprocket tooth, are significantly reduced, and wear of the outer engagement surfaces 112a of the guide row plates 112 is suppressed, extending the useful life of the chain.

Furthermore, when the outer engagement surfaces 121a of the joint row plates 121 abut a sprocket tooth, the curved recesses 121b, which partially surround the engagement pin 140 and provide a clearance for the engagement pin, allow the joint row plate to bend and exhibit a cushioning effect, while absorbing and reducing the load on the joint row plates 121. Therefore, impact noises and impact forces generated as the outer engagement surfaces 121a of the joint row plates begin to engage a sprocket tooth are also significantly reduced, and wear of engagement surfaces 121a is suppressed. Thus, the recesses 121b further contribute to the extension of the useful life of the chain.

We claim:

1. An elongated silent chain comprising:
   guide link rows each composed of a pair of opposed guide plates and a plurality of guide row plates disposed between said pair of guide plates, each of said guide row plates having a pair of teeth having inner and outer flanks, said outer flanks having outer engagement surfaces for seating engagement with sprocket teeth;
   joint link rows, each composed of a plurality of joint row plates, each of said joint row plates also having inner and outer flanks, the outer flanks of the teeth of the joint link rows having outer engagement surfaces for seating engagement with sprocket teeth;
   the guide link rows and joint link rows being arranged alternately along the length of the chain, and the plates of the each joint link row being interleaved with the plates of two adjacent guide link rows and extending between the guide plates of said adjacent guide link rows;
   connecting pins connecting said guide link rows and said joint link rows in articulating relationship;
   a pair of engagement pins connecting one of the opposed guide plates of each guide link row with the other of said opposed guide plates of the same guide link row, said engagement pins of each guide link row having outer surfaces protruding beyond the outer engagement surfaces of the guide row plates in the same guide link row, whereby the engagement pins abut sprocket teeth before the sprocket teeth are engaged by the outer engagement surfaces of the guide row plates;
   each guide plate having a cutout portion, adjacent each of the engagement pins attached to the guide plate, both cutout portions of each guide plate being located between the engagement pins, and enabling portions of the guide plates to which the engagement pins are connected to deform and thereby absorb loads generated on abutment of the engagement pins with sprocket teeth;
   a recess formed in each outer engagement surface of each guide row plate, the engagement pins of each guide row extending through the recesses in the guide row plates thereof, said recesses being sufficiently deep to allow abutment of the outer engagement surfaces of the teeth of the guide row plates with sprocket teeth following abutment of the engagement pins with the sprocket teeth; and
   a recess formed in each inner flank of each joint row plate, each said recess partially surrounding an engagement pin of an adjacent guide row at least when the chain is stretched in a straight line, the recesses in the inner flanks of the joint row plates allowing deformation of the teeth of the joint row plates on engagement of their outer flanks with sprocket teeth, thereby reducing the load on the joint row plates.

2. A silent chain according to claim 1, in which each of the guide plates, the guide row plates and the joint row plates of the chain has front and rear portions spaced from each other along the direction of elongation of the chain, and in which the front and rear portion of each said plate are symmetrical about a plane of symmetry located between said front and rear portions.

3. A silent chain according to claim 2, in which each recess in an outer engagement surface of each guide row plate overlaps a recess in the inner flank of an adjacent joint row plate, the overlapping recesses both partially surrounding an engagement pin.

4. A silent chain according to claim 3, in which the strength of each said guide plate is smaller than the strength of each said guide row plate and each said joint row plate.

5. A silent chain according to claim 2, in which the strength of each said guide plate is smaller than the strength of each said guide row plate and each said joint row plate.

6. A silent chain according to claim 1, in which each recess in an outer engagement surface of each guide row plate overlaps a recess in the inner flank of an adjacent joint row plate, the overlapping recesses both partially surrounding an engagement pin.

7. A silent chain according to claim 6, in which the strength of each said guide plate is smaller than the strength of each said guide row plate and each said joint row plate.

8. A silent chain according to claim 1, in which the strength of each said guide plate is smaller than the strength of each said guide row plate and each said joint row plate.

* * * * *